C. S. KERSHNER.
MOTOR FOR MAGNETOS.
APPLICATION FILED MAR. 9, 1909.

943,420.

Patented Dec. 14, 1909.
2 SHEETS—SHEET 1.

Witnesses

Inventor
Charles S. Kershner
By
Attorney

C. S. KERSHNER.
MOTOR FOR MAGNETOS.
APPLICATION FILED MAR. 9, 1909.

943,420.

Patented Dec. 14, 1909.
2 SHEETS—SHEET 2.

Witnesses
J. R. Woodworth
W. Willis

Inventor
Charles S. Kershner
By Chandlee Chandlee
Attorney

UNITED STATES PATENT OFFICE.

CHARLES S. KERSHNER, OF WESTPHALIA, KANSAS.

MOTOR FOR MAGNETOS.

943,420.  Specification of Letters Patent.  Patented Dec. 14, 1909.

Application filed March 9, 1909. Serial No. 482,265.

*To all whom it may concern:*

Be it known that I, CHARLES S. KERSHNER, a citizen of the United States, residing at Westphalia, in the county of Anderson, State of Kansas, have invented certain new and useful Improvements in Motors for Magnetos; and I do hereby declare the following to be a full, clear, and exact description of the invention, such as will enable others skilled in the art to which it appertains to make and use the same.

This invention relates to motors and has special reference to a motor for actuating the magneto of the sparking mechanism used in connection with internal combustion engines.

The principal object of the invention is to provide a novel and efficient means whereby the magneto may be started manually and then continuously operated by the explosive engine.

With the above and other objects in view, the invention consists in general of certain novel details of construction and arrangement of parts hereinafter fully described, illustrated in the accompanying drawings, and specifically set forth in the claim.

Figure 1:
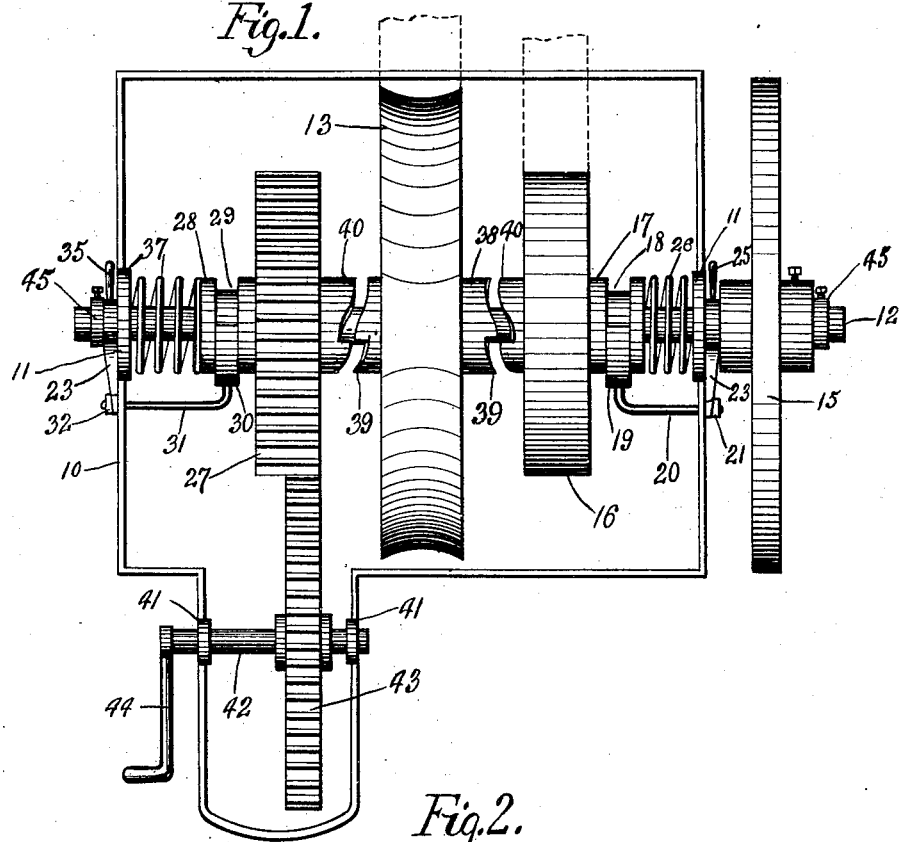
Figure 2:
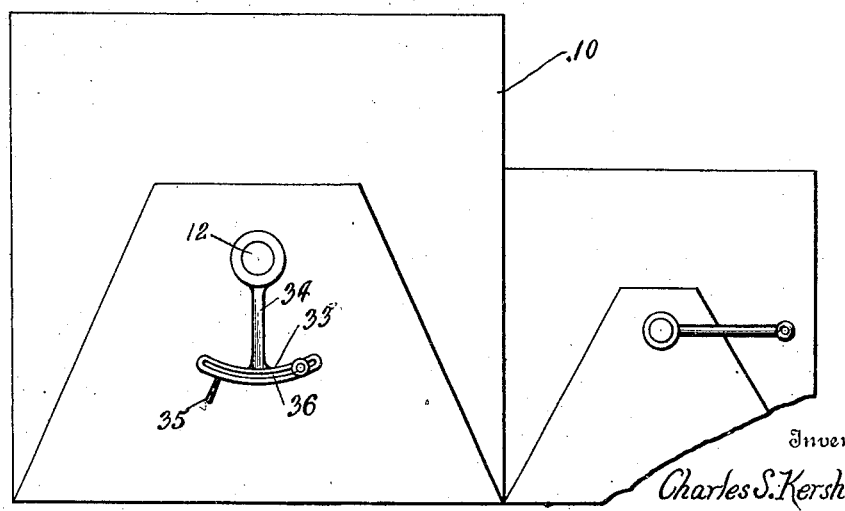
Figure 3:
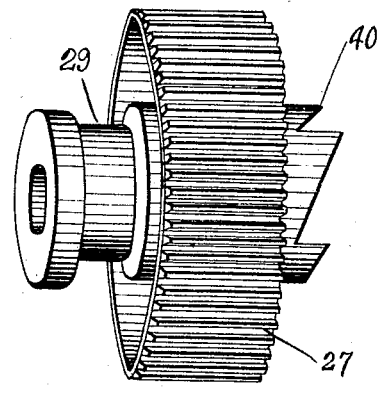
Figure 4:
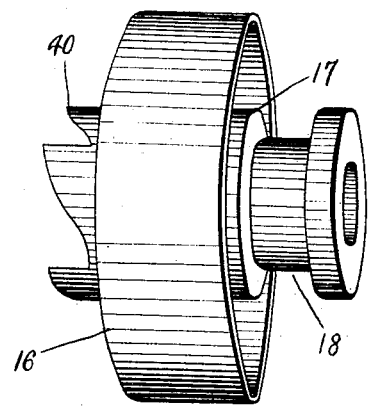
Figure 6:
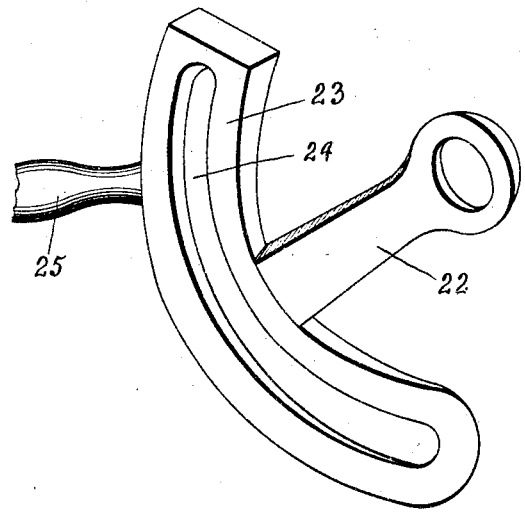
Figure 5:
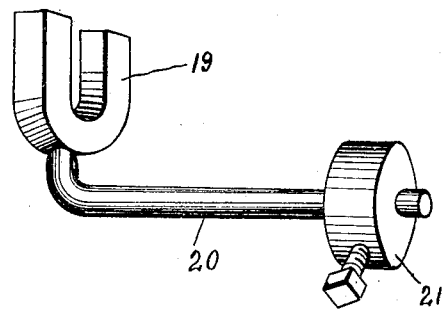

In the accompanying drawings, like characters of reference indicate like parts in the several views, and; Figure 1, is a top plan view of the invention, the top of the casing being removed to show the working parts. Fig. 2 is a side elevation from the manually operable end. Fig. 3 is a detailed perspective of the manually operable gear on the shaft. Fig. 4 is a similar view of the belt or chain driven gear. Fig. 5 is a perspective view of a shipper used with this device. Fig. 6 is a similar view of the shipper operating cam.

The numeral 10 indicates the housing or casing of the invention and this housing is provided with suitable bearings 11 wherein is mounted a shaft 12. Securely fixed upon the shaft 12 is a drive pulley 13 provided with a rubber tire or belt adapted to contact with and operate the pulley of a magneto. There is also keyed upon the shaft 12 a flywheel 15, the same being preferably located outside of the housing 10.

Slidably and rotatably mounted upon the shaft 12 is a belt pulley 16 adapted to be connected by a suitable belt to a pulley on the engine shaft. The hub of this pulley 16 is provided with an extension 17 around which is formed an annular groove 18. A shipper fork 19 is held in the groove 18 and this shipper fork is provided with a stem 20 whereon is fixed a collar 21. Upon the shaft 12 is mounted an arm 22 so arranged as to be freely rotatable on said shaft. Upon the outer end of this arm is carried a wedge shaped arcuate member 23 provided with a centrally disposed slot 24. Attached to the arcuate member 23 is a handle 25.

The stem 20 projects through the housing 10 and passes through the slot 24, the collar 21 being held closely upon the outer face of the member 23. It will now be obvious that if the handle 25 be moved so that the collar 21 is caused to rise on the wedge shaped member 23, the pulley 16 will be drawn toward the member 23. For the purpose of permitting the pulley 16 to resume its original position when the handle 25 is moved in the opposite direction there is provided a spring 26 located between the hub extension 17 and the bearing 11. Upon the opposite side of the pulley 13 there is provided a gear 27 having an extension 28 upon its hub provided with an annular groove 29. At this end of the device there is also provided a fork 30 having a stem 31 and collar 32 similar to those at the opposite end. This stem 31 passes through an arcuate member 33 rotated upon the end of an arm 34 rotatably mounted on the shaft 12 and this arcuate member is provided with a handle 35. This arcuate member 33 is also provided with a slot 36 and is in every respect similar to the member 23 at the opposite end, being used for the purpose of drawing the gear 27 away from the pulley 13. For the purpose of forcing this gear toward the pulley 13 there is provided a spring 37 similar to the spring 26.

The hub 38 of the pulley 13 is provided with clutch teeth 39 upon each end thereof and the hubs of the pulleys 16 and 27 are likewise provided with clutch teeth 40 upon the end adjacent the pulley 13. Bearings 41 are also mounted upon the housing 10 and these bearings serve to support a short shaft 42 whereon is mounted a gear 43 arranged to mesh with the gear 27. A handle crank 44 is also securely keyed to the shaft 42 so that upon the rotation of the crank 44 the gear 43 will likewise rotate therewith.

Collars 45 are secured at the outer ends of the shaft to prevent the various parts from moving therealong.

In the operation of this device let it be supposed that the engine is at rest and that the pulley 13 is in contact with the driving pulley of the magneto while the pulley 16 is belted to the engine. Now, in order to start the magneto and produce the proper spark the handle 25 is so turned as to disengage the clutch teeth 40 of the pulley 16 from the clutch teeth 39 with which they are normally in engagement. The handle 35 is then turned to permit the engagement of the clutch teeth 40 of the pulley 27 with the clutch teeth 39 of the pulley 13. The crank handle 44 is then given several rapid turns. This stores up energy in the fly-wheel 15 and the pulley 13 is rapidly rotated, first by the crank handle and then by the stored up energy of the pulley 15, the handle 35 being rotated to draw the teeth 40 of the pulley 27 out of engagement with the teeth 39 of the pulley 13. This will serve to give the proper spark to start the engine and then as soon as the engine has been started the clutch teeth 40 of the pulley 16 may be allowed to engage with the clutch teeth 39 on the pulley 13. This having been done the engine itself keeps up the rotation of the pulley 13 and consequently of the magneto, thus producing the regular magneto spark.

By means of this arrangement the ordinary storage battery is rendered useless so that it is not necessary to have a storage battery around a gas engine. There has thus been provided a simple and efficient device of the character described and for the purpose specified.

It is obvious that many minor changes may be made in the form and construction of the invention without departing from the material principles thereof. It is not, therefore, desired to confine the invention to the exact form herein shown and described, but it is wished to include all such as properly come within the scope of the appended claim.

Having thus described the invention, what is claimed as new, is:—

In a motor for magnetos, a rotatably supported shaft, a drive pulley fixed thereon to rotate therewith a fly-wheel fixed on said shaft, a manually operable gear slidably and rotatably mounted on the shaft, a belt pulley adapted for connection to an engine, clutch elements adapted to connect the drive pulley with either the gear or belt pulley, springs normally forcing said belt pulley and gear into engagement with the drive pulley, shipper forks engaging the hubs of said belt pulley and gear, a stem projecting laterally from each of said shipper forks, arcuate cams each provided with a slot adapted to receive one of said stems, said cams being pivoted on said shaft, collars on said stems bearing against said cams, and a handle on each of said cams adapted to rotate the same and force the belt pulley and gear away from the drive pulley.

In testimony whereof, I affix my signature, in presence of two witnesses.

CHARLES S. KERSHNER.

Witnesses:
J. E. STEPHENSON,
W. S. GREFFUL.